United States Patent [19]

Hirose et al.

[11] Patent Number: 4,653,807
[45] Date of Patent: Mar. 31, 1987

[54] ADJUSTABLE SEAT ASSEMBLY

[75] Inventors: Kazutaka Hirose; Yutaka Shimazu, both of Hiroshima, Japan

[73] Assignee: Mazda Motor Corporation, Hiroshima, Japan

[21] Appl. No.: 733,745

[22] Filed: May 14, 1985

[30] Foreign Application Priority Data

| May 18, 1984 | [JP] | Japan | 59-73551[U] |
| May 21, 1984 | [JP] | Japan | 59-74769[U] |
| May 23, 1984 | [JP] | Japan | 59-76492[U] |

[51] Int. Cl.⁴ .............................................. B60N 1/02
[52] U.S. Cl. .................................. 297/367; 74/471 R; 248/430; 297/330; 297/346
[58] Field of Search ............... 297/366, 367, 346, 341, 297/342, 330, 329, 417; 248/396, 429, 430; 74/529, 480 R, 471 R

[56] References Cited

U.S. PATENT DOCUMENTS

| 1,073,775 | 9/1913 | Michaud | 74/471 R |
| 1,452,296 | 4/1923 | Howard | 74/471 R |
| 3,403,574 | 10/1968 | Castelet | 74/471 R |
| 3,632,166 | 1/1972 | Lohr | 297/367 X |
| 3,957,312 | 5/1976 | Bonnaud | 297/366 X |
| 4,159,147 | 6/1979 | Kiyomitsu et al. | 297/341 |
| 4,432,583 | 2/1984 | Russo et al. | 297/330 |
| 4,440,442 | 4/1984 | Drouillard et al. | 297/329 X |
| 4,470,632 | 9/1984 | Babbs | 297/330 X |
| 4,508,385 | 4/1985 | Bowman | 297/341 |

FOREIGN PATENT DOCUMENTS

| 7107 | 1/1980 | European Pat. Off. | 297/367 |
| 29997 | 6/1981 | European Pat. Off. | 297/367 |
| 20523 | 2/1977 | Japan | 297/367 |

Primary Examiner—Kenneth J. Dorner
Assistant Examiner—Thomas A. Rendos
Attorney, Agent, or Firm—Burns, Doane, Swecker & Mathis

[57] ABSTRACT

An adjustable seat assembly which comprises a seat bottom and a seat back, a reclining mechanism for connecting the seat back to the seat bottom for the adjustment of the tilt of the seat back relative to the seat bottom, a slide mechanism for mounting the seat bottom on a support surface for the adjustment of the position of the seat in a direction along the support surface, and a multifunctional handle supported for movement in at least first and second directions for controlling the reclining and slide mechanisms, respectively. Where the seat assembly further comprises a seat lifting mechanism for the adjustment of the height of the seat above the support surface, the handle may be rendered movable also in a third direction, in which case the first and second are opposite to each other and the third direction is perpendicular to any one of the first and second directions.

6 Claims, 19 Drawing Figures

ADJUSTABLE SEAT ASSEMBLY

BACKGROUND OF THE INVENTION

The present invention relates to an adjustable seat assembly in an automobile.

Almost all passenger cars currently available employ a seat assembly of a type wherein, not only can the angle of tilt of the seat back be adjustable, but the height of the seat above the floor and the position of the seat in a direction longitudinally of the automobile body structure can also be adjustable. This type of seat assembly is provided with a reclining mechanism for the seat tilt adjustment, a seat lifting mechanism of the seat height adjustment and a slide mechanism for the seat position adjustment. The use of the adjustable seat assembly is effective not only to provide the automobile with a luxurious atmosphere, but also to render the seat to suit the occupant's liking and/or physical build.

However, any of the prior art adjustable seat assemblies requires the use of an operating handle for each of the reclining, slide and lifting mechanisms. For example, Japanese Laid-open Utility Model Publication No. 57-48139, published Mar. 17, 1982, discloses an adjustable seat assembly provided with the reclining and slide mechanisms. The reclining and slide mechanisms disclosed therein make use of their own operating handles, the operating handle for the reclining mechanism being disposed on one side of the seat adjacent the pivotal joint between the seat back and the seat bottom whereas the operating handle for the slide mechanism is disposed beneath the seat bottom so as to protrude forwards outwards from the seat bottom.

Japanese Laid-open Utility Model Publication No. 57-109936, published July 7, 1982, discloses an adjustable seat assembly similar to that disclosed in the first mentioned publication, but wherein both of the independent operating handles for the reclining and slide mechanisms are disposed on one side of the seat adjacent the pivotal joint between the seat back and the seat bottom.

The use of the independent operating handles for the different mechanisms requires a relatively large space for installation thereof and may force the occupant or driver to undergo an undue physical movement when two or all of the tilt adjustment, the height adjustment and the position adjustment are desired to be performed.

SUMMARY OF THE INVENTION

Accordingly, the present invention has been developed with a view to substantially eliminating the above described inconveniences and disadvantages inherent in the prior art seat assembly and has for its essential object to provide an improved seat assembly wherein at least the tilt adjustment and the position adjustment can be performed by the use of a single handle.

Another important object of the present invention is to provide an improved seat assembly of the type referred to above, wherein the number of operating elements necessary to carry out these adjustments is advantageously minimized to save space and to minimize the increase of the manufacturing cost.

In order to accomplish these objects, the present invention provides an improved adjustable seat assembly which comprises a seat bottom and a seat back, a reclining mechanism for connecting the seat back to the seat bottom for the adjustment of the tilt of the seat back relative to the seat bottom, a slide mechanism for mounting the seat bottom on a support surface for the adjustment of the position of the seat in a direction along the support surface, and a multifunctional handle supported for movement in at least first and second directions for controlling the reclining and slide mechanisms, respectively. Where the seat assembly further comprises a seat lifting mechanism for the adjustment of the height of the seat above the support surface, the handle may be rendered movable also in a third direction, in which case the first and second are opposite to each other and the third direction is perpendicular to any one of the first and second directions.

In another embodiment of the present invention, the adjustable seat assembly is provided with means for inhibiting any arbitrary movement of the handle in any one of the first and second directions during the pivotal movement of the handle in the third direction for the seat height adjustment. The use of this inhibiting means is advantageous in that any possible erroneous operation of one or both of the reclining and slide mechanism can be avoided during the seat height adjustment.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE EMBODIMENTS

Figure 1:
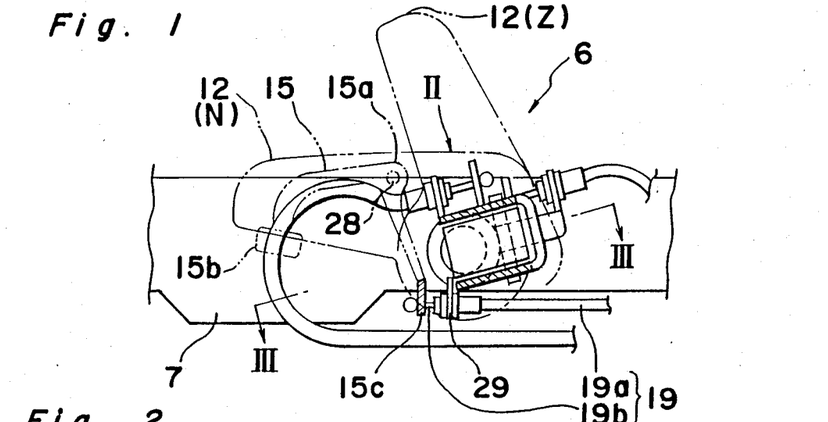
FIG. 1 is a side sectional view of a multifunctional handle assembly incorporated in an adjustable seat assembly according to a first embodiment of the present invention.
Figures 2, 3:
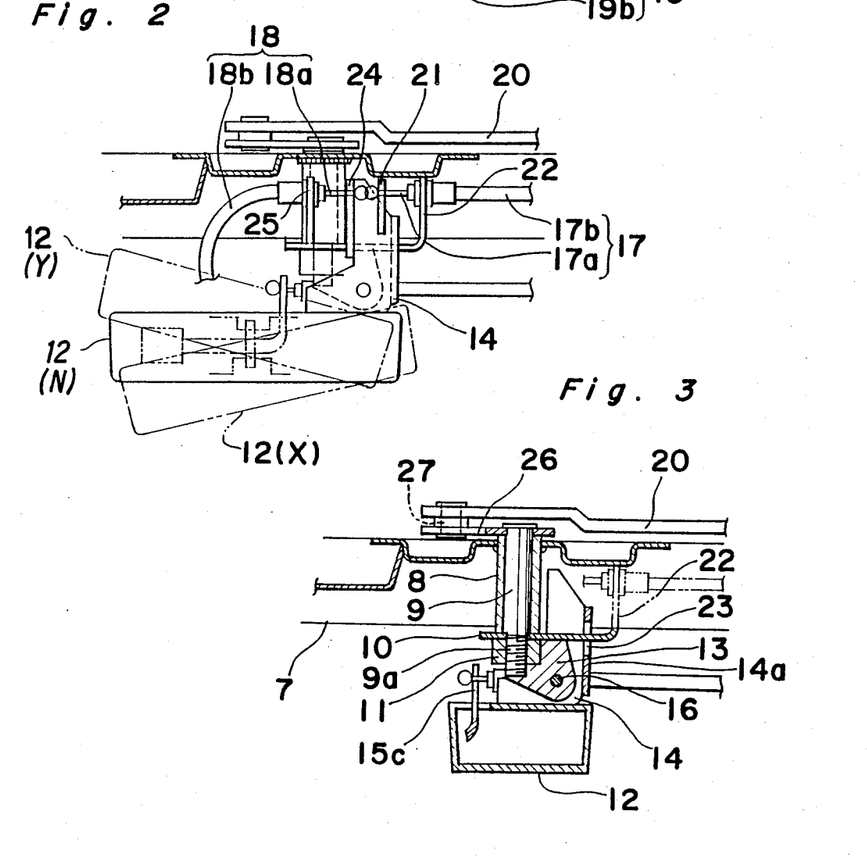
FIG. 2 is a top plan view of the handle assembly shown in FIG. 1.
FIG. 3 is a top sectional view of the handle assembly shown in FIG. 1.
Figure 4:
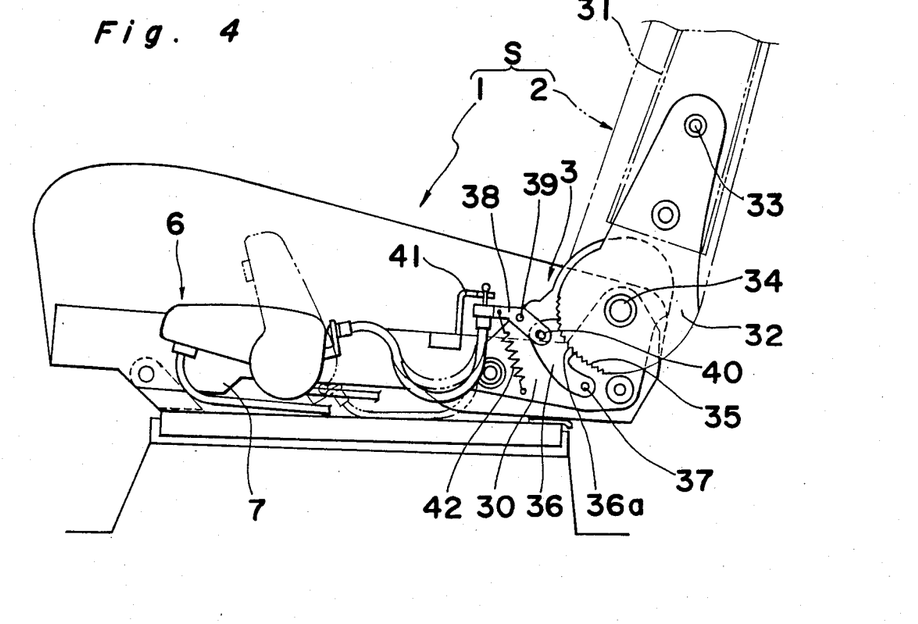
FIG. 4 is a side view of the seat assembly showing a reclining mechanism coupled with the handle assembly.
Figure 9:
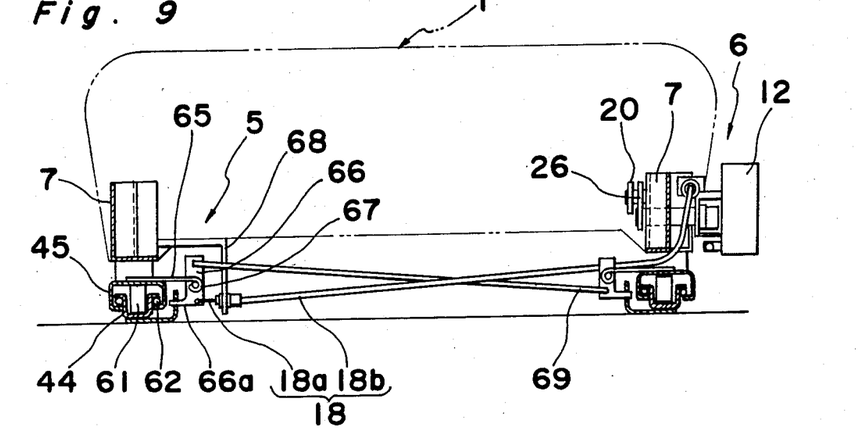
FIG. 9 is a front sectional view showing a slide mechanism.
Figure 10:
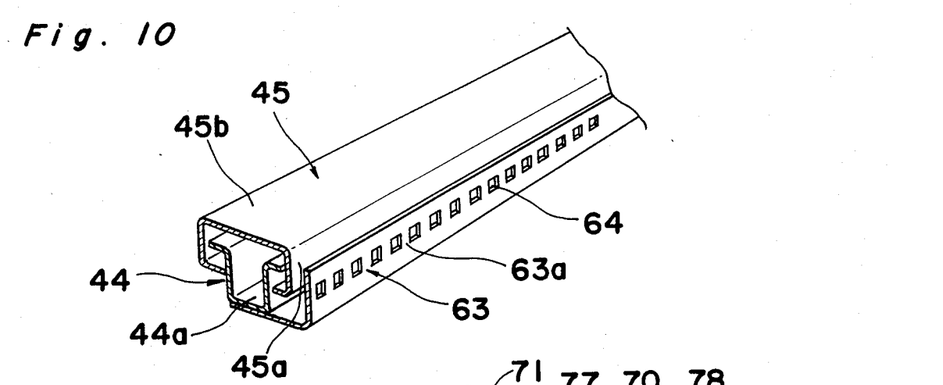
FIG. 10 is a perspective view of a portion of the slide mechanism showing a slide rail telescopically movably mounted on a guide rail.

An adjustable seat assembly to which the present invention is applied comprises a seat S, including a seat bottom 1 and a seat back 2 as best shown in FIG. 4, a reclining mechanism 3 also best shown in FIG. 4 for adjusting the tilt, i.e. the angle of inclination, of the seat back 2 relative to the seat bottom 1, a lifting mechanism 4 best shown in FIGS. 5 to 8 for adjusting the height of the seat bottom 1, and, hence, the seat S as a whole, above the floor inside an automobile body structure, and a slide mechanism 5 best shown in FIGS. 9 and 10 for adjusting the position of the seat S in a direction longitudinally of the automobile body structure and, more specifically, in a direction close towards and away from a steering wheel in the driver's seat. For controlling the reclining, lifting and slide mechanisms 3, 4 and 5, a single and common multifunctional handle assembly 6 best shown in FIGS. 1 to 3 is employed.

The handle assembly 6 is arranged at a left-hand side of the seat bottom 1 and at a location somewhat set rearwardly from the front edge of the seat bottom 1 and is movably supported by a framework 7 forming a part of the seat bottom 1. It is to be noted that for the purpose of the present invention, the terms "front", "rear", "forward", "rearward", "left" and "right" and other similar terms descriptive of the direction and the relative position, hereinbefore and hereinafter referred to, are to be understood as used in reference to an occupant of the seat 7.

The multifunctional handle assembly 6 comprises a bearing sleeve 8, a pivot shaft 9, a bearing bracket 13, a bracket 14, an operating lever 12 and an auxiliary lever 15. The bearing sleeve 8 is fixedly supported by the framework 7 of the seat bottom 1 so as to extend horizontally in a direction widthwise of the seat S with its outer end protruding outwardly from the framework 7. The pivot shaft 9 rotatably received in and extending completely through the bearing sleeve 8 has its opposite, outer and inner ends protruding outwardly from the bearing sleeve 8. The outer end of the pivot shaft 9 exteriorly of the bearing sleeve 8 is radially inwardly stepped to provide a reduced diameter portion which is exteriorly threaded at 9a for receiving a fastening nut 11 with a collar plate 10 firmly clamped between the nut 11 and the shoulder on one side of the exteriorly threaded, reduced diameter portion 9a, so that the pivot shaft 9 can be rotatable together with the collar plate 10 and the fastening nut 11 relative to the bearing sleeve 8. On the other hand, the inner end of the pivot shaft 9 exteriorly of the sleeve 8 is provided with an intermediate link 26 having one end rigidly mounted thereon for movement together with the pivot shaft 9 and the other end positioned frontwardly upwardly of the inner end of the pivot shaft 9, to which other end of the intermediate link 26 is pivotally connected a plate link 20 by means of a connecting pin 27. The plate link 20 having one end connected with the intermediate link 26 extends rearwardly with the other end positioned adjacent the rear edge of the seat bottom 1 for the purpose which will become clear later and can be moved axially thereof when the pivot shaft 9 is rotated as will be described later.

The bearing bracket 13 used for connecting the operating lever 12 to the pivot shaft 9 is rigidly connected by means of welds with the exteriorly threaded portion 9a of the pivot shaft 9, the fastening nut 11 and the collar plate 10. The bracket 14 having a generally U-shaped cross-section is exteriorly loosely inserted in the bearing bracket 13 and is pivotally coupled with the bearing bracket 13 by means of a pivot pin 16, which bracket 14 has an outer end face to which a portion adjacent the rear end of the operating lever 12 is rigidly secured. The pivot pin 16 lies in a plane perpendicular to the floor panel and is slightly inclined forwardly and, about this pivot pin 16, the operating lever 12 is pivotable from a neutral position N towards any one of first and second operative positions X and Y on left-hand and right-hand sides of the neutral position N, respectively, as shown in FIG. 2. The operating lever 12 is also pivotable from the neutral position towards a third operative position Z about the longitudinal axis of the pivot shaft 9 as shown in FIG. 1.

The pivotal movement of the operating lever 12 from the neutral position towards the first operative position X results in the reclining mechanism 3 being controlled through a first release cable 17; the pivotal movement of the operating lever 12 towards the second operative position Y results in the slide mechanism 5 being controlled through a second release cable 18; and the pivotal movement of the operating lever 12 towards the third operative position Z results in the lifting mechanism 4 being controlled through a third release cable 19 by means of the link plate 20. The lifting mechanism 4 can also be controlled through the third release cable 19 even when the auxiliary lever 15 is manipulated.

More specifically, the first release cable 17 includes a cable wire 17a and a tubular sheath 17b through which the cable wire 17a extends movably. One of the opposite ends of the cable wire 17a exteriorly of the sheath 17b is engaged to a first engagement 21 integral with the bracket 14, whereas one of the opposite ends of the tubular sheath 17b adjacent the first engagement 21 is secured to a first fixture 22 integrally formed with the collar plate 10, which first fixture 22 extends from the collar plate 10 interiorly of the bracket 14 and loosely through an opening 23 in a rear wall 14a of the bracket 14 so as to avoid any possible interference between the first fixture 22 and the bracket 14 pivotable about the pivot pin 19. Thus, it will readily be seen that, when the bracket 14 is pivoted counterclockwise about the pivot pin 16 as viewed in FIGS. 2 and 3 as a result of the movement of the operating lever 12 from the neutral position N towards the first operative position X, the cable wire 17a of the first release cable 17 is pulled forwards by the first engagement 21 relative to the tubular sheath 17b of the first release cable 17 then held still by the first fixture 22.

Similarly, the second release cable 18 includes a cable wire 18a and a tubular sheath 18b through which the cable wire 18a extends movably. One of the opposite ends of the cable wire 18a exteriorly of the sheath 18b is engaged to a second engagement 24 integral with the bracket 14, whereas one of the opposite ends of the sheath 18b adjacent the second engagement 24 is secured to a second fixture 25 rigidly secured to the collar plate 10. Accordingly, when the bracket 14 is pivoted clockwise as viewed in FIGS. 2 and 3 about the pivot pin 16 as a result of the pivotal movement of the operating lever 12 from the neutral position N towards the second operative position Y, the cable wire 18a is pulled rearwards relative to the sheath 18b then held still by the second fixture 25.

When the operating lever 12 is pivoted from the neutral position N towards the third operative position accompanied by the rotation of the pivot shaft 9 within the bearing sleeve 8, the plate link 20 is pulled rearwards by the reason stated hereinbefore, i.e., because of the connection between the pivot shaft 9 and the plate link 20 through the intermediate link 26.

The auxiliary lever 15, assembled into the operating lever 12, has its substantially intermediate portion 15a pivotally connected to the operating lever 12 by means of a pin 28 and also has a generally L-shaped handle area 15b at one end which handle area 15b protrudes outwards from an opening defined at the bottom of the operating lever 12. The other end of the auxiliary lever 15 extends obliquely downwards from the intermediate portion 15a and through the opening at the bottom of the operating lever 12 and further extends generally horizontally to provide an engagement 15c to which one of the opposite ends of a cable wire 19a, forming the third release cable 19 together with a tubular sheath 19b is engaged. One of the opposite ends of the sheath 19b of the third release cable 19 is secured to a third fixture 29 rigid or integral with the collar plate 10 whereby, when the handle area 15b is pulled upwards by one or some fingers of the left hand of, for example, a driver then holding the operating lever 12, the auxiliary lever 15 is pivoted about the pin 28 with the engagement 15c pulling the cable wire 19a of the third release cable forwards.

The details of each of the reclining, lifting and slide mechanism 3, 4 and 5 all controllable by the multifunctional handle assembly 6 of the construction described above will now be described with reference to FIGS. 4 to 10.

Referring first to FIG. 4, a reinforcement fixture 30 is secured on each side of the seat bottom 1 exteriorly to a respective rear end portion of the framework 7 on the one hand and an arm plate 32 is secured on each side of the seat back 2 exteriorly to a respective lower end of a framework 31 for the seat back 1 by means of fastening members 33 on the other hand. The seat back 2 is tiltably mounted on the seat bottom 1 with the left-hand and right-hand arm plates 32 exteriorly journalled to the associated, left-hand and right-hand fixtures 30 by means of respective bearing pins 34. Only one of the arm plates 32, that is, the left-hand arm plate 32 so far shown, has a sector gear 35 formed at a lower, rounded end of the arm plate 32, which sector gear 35 is constantly meshed with a geared area 36a of a latch member 36 pivotally connected exteriorly to the associated reinforcement fixture 30 by means of a pivot pin 37, said latch member 36 being normally urged clockwise about the pivot pin 36 by the action of a biasing spring 42 with the geared area 36a consequently engaged with the sector gear 35 thereby to lock the seat back 2 at one of a plurality of predetermined angles relative to the seat bottom 1. The biasing force of the biasing spring 42 is transmitted to the latch member 36 through an intermediate lever 38 pivotally mounted exteriorly on the fixture 30 by means of a pivot pin 39 and having its opposite ends which are connected with the latch member 36 pivotally by means of a connecting pin 40 and with the other end of the tubular sheath 17b of the first release cable 17, respectively. The other end of the cable wire 17a of the fist release cable 17 is secured to a bracket 41 rigidly mounted on the framework 7.

Although the reclining mechanism 3 including the sector gear 35, the latch member 36 and the intermediate lever 38 has been shown and described as provided only on the left-hand side of the seat S, it may be additionally provided on the right-hand side of the same seat S in which case the intermediate lever 38 should be operatively coupled with a similar intermediate lever on the right-hand side of the seat S for controlling the reclining mechanism on the right-hand side of the seat S in dependence on the manipulation of the multifunctional handle assembly 6.

The reclining mechanism 3 so far shown and described operates in the following manner.

As hereinbefore described, when the operating lever 12 is pivoted from the neutral position N to the first operative position X, the cable wire 17a of the first release cable 17 is pulled forwards. When the cable wire 17a is pulled forwards, the passage of the first release cable 17 is shortened and the tubular sheath 17b, therefore, becomes excessive with the other end of the sheath 17b consequently pushing the intermediate lever 38 upwards, resulting in the pivotal movement of the lever 38 against the biasing spring 42 with the geared area 36a of the latch member 36 disengaged from the sector gear 35.

Subsequent to the disengagement of the geared area 36a of the latch member 36 from the sector gear 35, the seat back 2 can be tilted at the driver's will. Once the tilt of the seat back 2 relative to the seat bottom 1 has been chosen, the operating lever 12 has to be returned from the first operative position X to the neutral position N, allowing the intermediate lever 36 to pivot as pulled by the biasing spring 42 with the geared area 36a engaged again with the sector gear 35 to lock the seat back 2 relative to the seat bottom 1.

Thus, it has now become clear that, when the operating lever 12 is moved to the first operative position X, the seat back 2 is rendered to be free to tilt relative to the seat bottom 1 for the purpose of the tilt adjustment.

The lifting mechanism 4 for the seat height adjustment is best shown in FIGS. 5 to 8, reference to which will now be made. It is to be noted that, although in practice the lifting mechanism 4 is used for each side of the seat bottom 1 and is assembled adjacent the rear end of the framework 7 inwardly of a left-hand or right-hand frame member forming the framework 7, only the left-hand lifting mechanism will be described for the sake of brevity.

Figure 5:
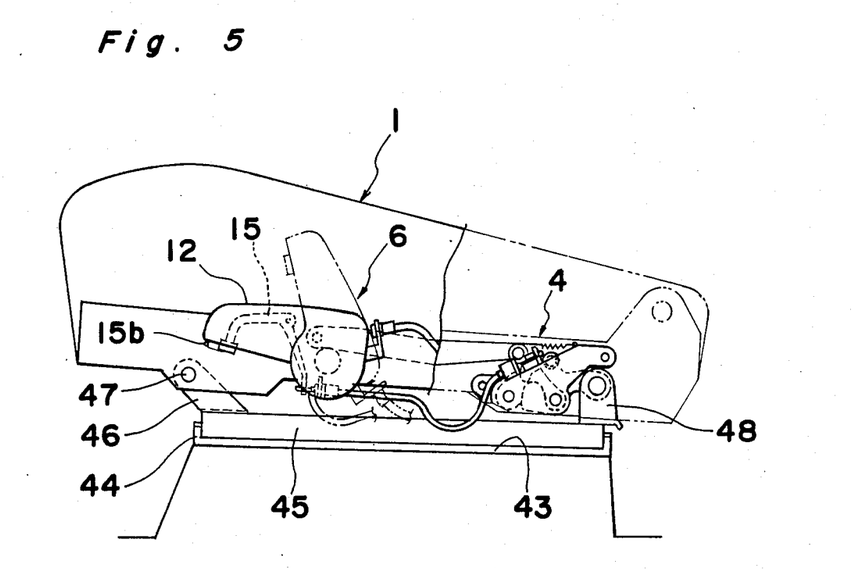
FIG. 5 is a side view of the seat assembly with a portion cut away to show a seat lifting mechanism.

The left-hand and right-hand frame members of the framework 7 supporting the seat bottom 1 thereon are mounted on respective slide rails 45, in a manner as will be described later, for movement together therewith in a direction parallel to the longitudinal sense of the automobile body structure, which slide rails 45 are in turn relatively telescopically movably mounted on respective guide rails 44 rigidly mounted on a deck panel 43. As best shown in FIG. 5, each of the side frame members of the framework 7 has a front leg member 46 pivotally secured at an upper end to a front end portion of the respective side frame member by means of a connecting pin 47, the other, lower end of said leg member 46 being rigidly mounted on the associated slide rail 45, whereas a rear end portion of the respective side frame member is supported by a respective rear leg member 48, rigidly mounted on the associated slide rail 45, through a stabilizer shaft 53 concurrently serving as a part of the lifting mechanism 4.

The lifting mechanism 4 is constituted by the plate link 20 connected with the pivot shaft 9 of the multifunctional handle assembly 6, a bearing link 49, a latch arm 50, a holder 51, a fixed plate, the stabilizer shaft 53 and others.

The bearing link 49 has an upper end pivotally connected with a rear end of the plate link 20 by means of a connecting pin 54, whereas a rear end of the bearing link 49 positioned a predetermined distance below the connecting pin 54 is rigidly connected to the stabilizer shaft 53. The bearing link 49 has a front edge portion formed with a sector gear 49a engageable with a geared area 50a formed in the latch member 50 which is pivotally connected in a cantilever fashion to the fixed plate 52 by means of a pivot pin 55.

The fixed plate 52 has its opposite, front and rear ends rigidly secured to the side frame member of the framework 7, a substantially intermediate portion of which fixed plate 52 is located exteriorly of the bearing link 49, the latch arm 50 and the holder 51.

For avoiding the arbitrary disengagement of the geared area 50a of the latch member 50 from the sector gear 49a, the holder 51 is provided which comprises a pair of plate members arranged on respective sides of both of the latch arm 50 and the bearing link 49 and connected at an upper end with each other by means of a pin 56 and at a lower end pivotally with the bearing link 49 by means of a pin 57, said holder 51 being normally biased rearwardly by a tension spring 58 which is connected at one end with an upper end of the holder 51 and at the other end with the fixed plate 52. With the holder 51 so biased, the latch arm 50 is urged by the pin 56 towards the bearing link 49 to cause the geared area 50a of the latch arm 50 to engage the sector gear 49a, thereby locking the bearing link 49 by means of the latch arm 50.

To make it possible that the geared area 50a can be disengaged from the sector gear 49a by means of the third release cable 19 when the auxiliary lever 15 is manipulated, the other end of the cable wire 19a of the third release cable 19 is engaged to a retainer 59 protruding laterally from an upper portion of the holder 51 while the other end of the tubular sheath 19b of the third release cable 19 is secured to a fixture 60 formed integrally with the fixed plate 52.

Although not shown, the right-hand lifting mechanism on the right-hand side of the seat S is comprised only of the bearing link 49 having no sector gear 49a, and the fixed plate 52, with all of the plate link 20, the latch arm 50 and the holder 51 being omitted. However, the right-hand lifting mechanism may be of a construction identical with the left-hand lifting mechanism, in which case the left-hand and right-hand plate links 20 should be connected with each other for movement together therewith and the third release cable 19 should be used in pair with one of them operatively coupled with the right-hand lifting mechanism.

The lifting mechanism 4 of the above described construction operates in the following manner.

Figure 6:
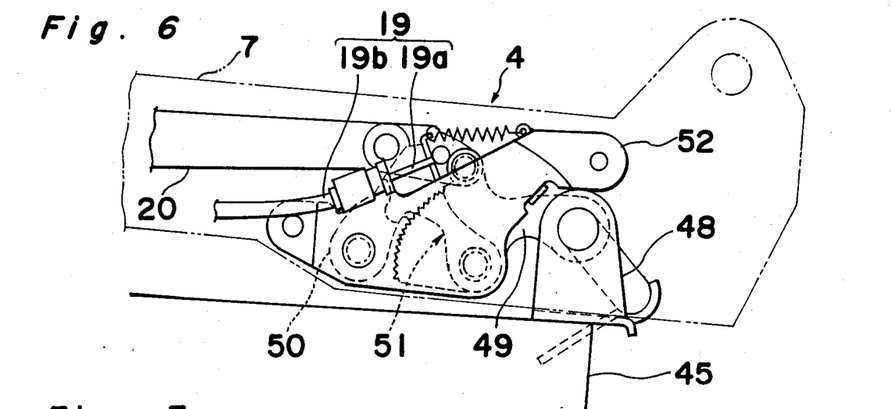
FIGS. 6 and 7 are side views, on an enlarged scale, of the seat lifting mechanism at different operative positions, respectively.
Figure 7:
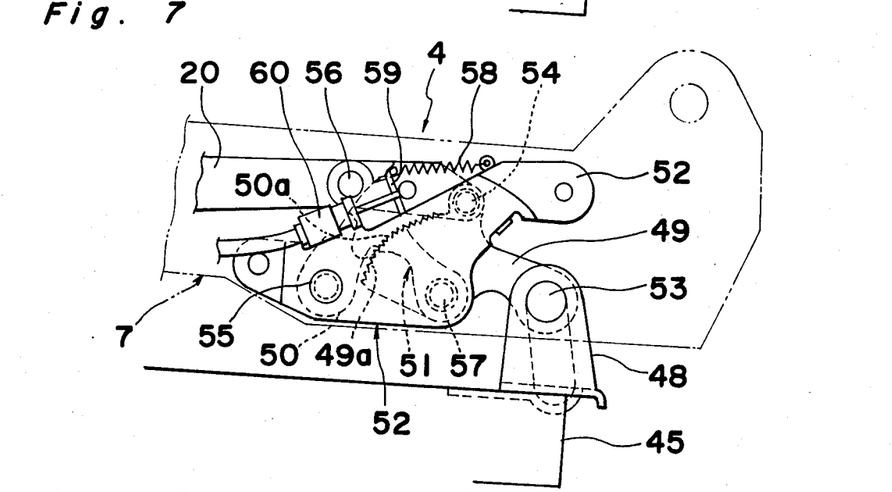
Figure 8:
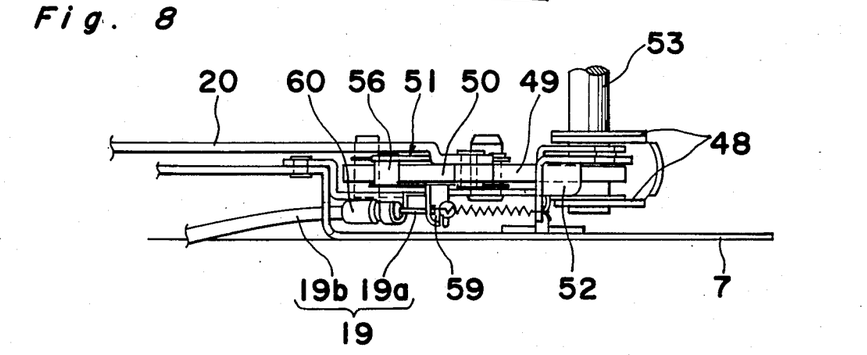
FIG. 8 is a top plan view of the seat lifting mechanism.

When the handle area 15b of the auxiliary lever 15 is pulled upwards in the manner as hereinbefore described, the cable wire 19a of the third release cable 19 is pulled forwards and, therefore, the holder 51 is pivoted counterclockwise, as viewed in FIGS. 6 and 7, against the tension spring 58 with the pin 56 on the holder 51 consequently separated away from the latch arm 50, allowing the geared area 50a of the latch arm 50 to be ready to disengage from the sector gear 49a of the bearing link 49.

When the operating lever 6 is subsequently pulled rearwards to cause the pivot shaft 9 to rotate clockwise about the longitudinal axis thereof as viewed in FIG. 4, the plate link 20 is pushed rearwards by means of the intermediate link 20 operatively connecting the pivot shaft 9 and the plate link 20 together. When the plate link 20 is so pushed rearwards, the bearing link 49 is pivoted upwards while the geared area 50a is disengaged from the sector gear 49a, thereby allowing the seat bottom 1 and, hence, the seat S as a whole, to be elevated from a lowered position shown in FIG. 6 to a raised position shown in FIG. 7 for the height adjustment. When the auxiliary lever 15 once pulled upwards is released from the external pulling force subsequent to the seat height adjustment, the latch arm 50 is urged by the spring 58 through the holder 51 towards the sector gear 49a with the geared area 50a consequently brought into engagement with the sector 49a to lock the seat S at a selected height position.

With respect to the right-hand lifting mechanism, since the bearing links 49 on the left-hand and right-hand sides of the seats, respectively, are connected together through the stabilizer shaft 53, the pivotal movement of the left-hand bearing link 49 through a predetermined angle is accompanied by the corresponding pivotal movement of the right-hand bearing link 49 through an equal angle and, accordingly, the seat S is elevated without being inclined sidewise.

It is to be noted that, since the bearing link 49 pivots an angle determined by the angle through which the operating lever 12 is pivoted towards the third operative position Z, the seat S can be elevated continuously to a desired height position by pivoting the operating lever 12 through a desired angle.

Referring to FIGS. 9 and 10, the slide mechanism 5 for adjusting the position of the seat S in a direction longitudinally of the automobile body structure will now be described. The slide rails 45 supporting the seat bottom 1 through the framework 7 and positioned on respective sides of the seat bottom 1 are telescopically movably mounted on the respective guide rails 44 through respective rows of rollers 61 and respective series of ball bearings 62, which guide rails 44 are rigidly mounted on the deck panel 43 so as to extend lengthwisely of the automobile body structure in parallel relation to each other. A wall member 63 rigidly secured from below to a bottom wall portion 44a of each of the guide rails 44 has a lateral wall portion 63a position inwardly of a side wall portion 45a of the associated slide rail 45 so as to extend in parallel and equidistantly spaced relation and formed with a straight row of equally spaced engagement holes 64 over the length thereof.

Each of the slide rails 45 has a generally elongated support plate 65 having one end rigidly secured to an upper wall portion 45a of the respective slide rail 45 so as to protrude beneath the seat bottom 1 in a direction perpendicular to the respective slide rail 45 from a substantially intermediate area of the upper wall portion 45a. This support plate 65 carries a stopper lever 66 having a substantially intermediate portion pivotally connected to the free end of the support plate 65 by means of a bearing pin 67 so as to extend in a direction perpendicular to the associated support plate 65. A lower end of the respective stopper lever 66 is formed with a few pawls 66a extending horizontally towards the lateral wall portion 63a of the associated wall member 63 and engaged into a corresponding number of the engagement holes 64 in that lateral wall portion 63a, thereby locking the adjacent slide rail 45. Although not shown, the stopper lever 66 on each side of the seat bottom 1 is normally urged in one direction about the associated bearing pin 67 by a respective tension or torsion spring with the pawls 66a engaged into the engagement holes 64.

The other end of the cable wire 18a of the second release cable 18 is engaged to the lower end of one of the stopper levers 66, whereas the other end of the tubular sheath 18b of the second release cable 18 is retained by a bracket 68 secured to the framework 7, an upper end of the stopper lever 66 remote from the other end of the cable wire 18b being connected with the lower end of the other stopper lever 66 through a connecting rod 69 so that the stopper levers 66 can be pivoted about the respective bearing pins 67 in a direction counter to each other.

The slide mechanism 5 of the construction described above operates in the following manner.

When and so long as the operating lever 12 of the multifunctional handle 6 is held at the neutral position N, the stopper levers 66 assume respective positions as shown in FIG. 99 by the action of the spring (not shown) with the pawls 66a engaged into the engagement holes 64 to lock the slide rails 45 and, hence, the seat S.

When the operating lever 12 in the neutral position N is pivoted to the second operative position Y, the cable wire 18a of the second release cable 18 is pulled relative to the tubular sheath 18b causing the right-hand stopper lever 66 to pivot about the associated bearing pin 67 against the spring followed by the pivotal movement of the left-hand stopper lever 66 about the associated bearing pin 67 in a direction counter to the direction of pivot of the right-hand stopper lever 66, with the respective pawls 66a consequently disengaged from the engagement holes 64 in the right-hand and left-hand lateral wall portions 63a. Upon the disengagement of the pawls 66a from the engagement holes 64, the slide rails 45 can slide freely relative to the guide rails 44 and, therefore, the position of the seats in a direction lengthwise of the automobile body structure can be adjusted.

The subsequent return of the operating lever 12 from the second operative position Y to the neutral position N results in the locking of the seat S at a selected position with respect to the lengthwise direction of the automobile body structure.

It is to be noted that the reclining, lifting and slide mechanisms 3, 4 and 5 applicable in the practice of the present invention may not be of the construction shown and described, but may be of any known construction. In any event, it has now become clear that, while all of the reclining, lifting and slide mechanisms 3, 4 and 5 are locked when and so long as the operating lever 12 is moved to or held in the neutral position N, the reclining, lifting and slide mechanism can be released one at a time when the operating lever 12 pivoted from the neutral position to the first operative position X, from the neutral position to the third operation position Z and from the neutral position to the second operative position Y, thereby enabling the tilt adjustment, the seat height adjustment and the seat position adjustment, respectively.

Figure 11:
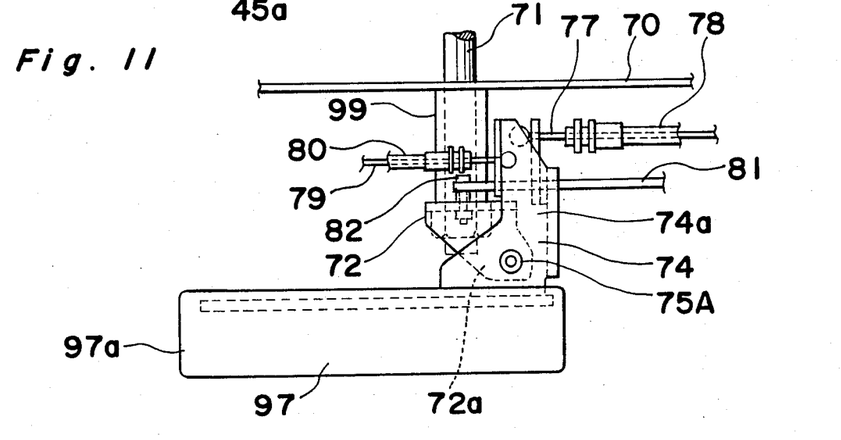
FIG. 11 is a view similar to FIG. 2, showing the handle assembly according to a second embodiment of the present invention.
Figure 12:
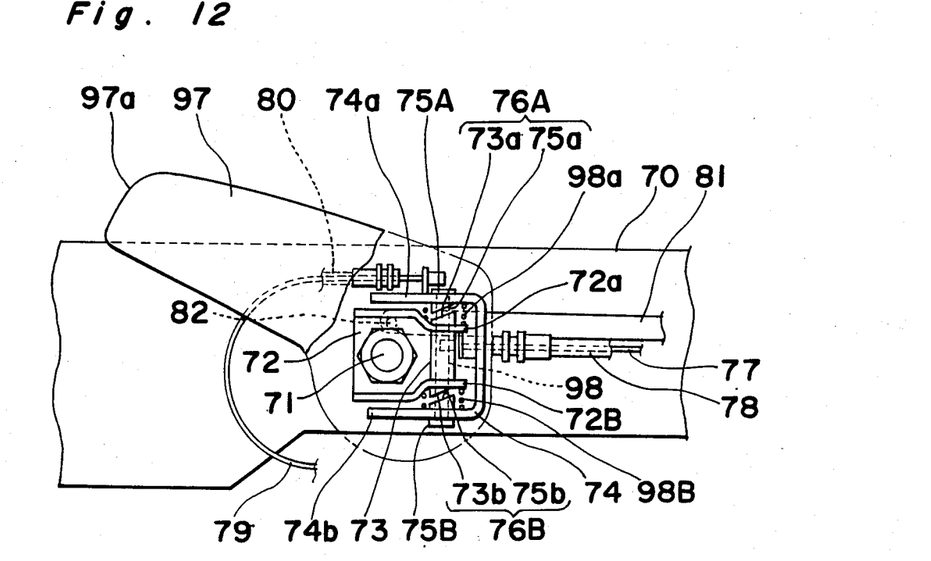
FIGS. 12 to 14 are side views, with an operating lever removed, of the handle assembly of FIG. 11 in different operative positions, respectively.

Referring now to FIGS. 11 to 14 illustrating a second preferred embodiment of the present invention, the multifunctional handle assembly comprises an operating lever 97 which is fitted to a seat framework 70 for pivotal movement in a direction widthwise of an automobile body structure and also in a direction heightwise of the automobile body structure by means of a horizontal pivot shaft 98, extending in a direction widthwise of the automobile body structure, and a vertical pivot shaft 99 extending in a direction heightwise of the automobile body structure as best shown in FIGS. 11 and 12. As best shown in FIG. 11, the vertical pivot shaft 99 is rotatably supported on and extends through a support shaft 71 secured rigidly to the framework 70 so as to extend through such framework 70 and is positioned exteriorly of the framework 70. As best shown in FIG. 12, an outer end of the pivot shaft 99 is provided with a bracket 72 having vertically opposed support arms 72a and 72b which support a shaft member 73 having its upper and lower ends non-rotatably extending through the support arms 72a and 72b, respectively, and a substantially intermediate portion situated therebetween. Respective end faces of the shaft member 73 are formed into cam faces 73a and 73b.

A bracket 74 of generally U-shaped cross-section which is provided interiorly of the operating lever 97 adjacent the bracket 72 and has upper and lower arms 74a and 74b is supported through the pivot shaft 98 by the bracket 72 so as to straddle the latter from the rear with the upper and lower arms 74a and 74b positioned exteriorly of the support arms 72a and 72b. Coil springs 98A and 98B are disposed around the shaft member 73 and are positioned respectively between the upper arm 74a of the bracket 74 and the upper support arm 72a of the bracket 72 and between the lower arm 74b of the bracket 74 and the lower support arm 72b of the bracket 72, each of said coil springs 98A and 98B having one end fixed to the arm 74a or 74b and the other end fixed to the arm 72a or 72b.

The upper and lower arms 74a and 74b of the bracket 74 carries respective stopper members 75A and 75B mounted thereon in coaxial relation with the pivot shaft 98. Respective portions of the stopper members 75A and 75B which face towards the associated cam faces 73a and 73b of the shaft member 73 are inclined to provide respective mating cam faces 75a and 75b complemental to the associated cam faces 73a and 73b, the cam face 73a and the mating cam face 75a being cooperable to provide a first engagement area 76A whereas the cam face 73b and the mating cam face 75b are cooperable to provide a second engagement area 76B. It is to be noted that, unless the operating lever 97 is manipulated, the shaft member 73 is normally held by the coil springs 98A and 98B in such a position that equal gaps are formed in the first and second engagement area 76A and 76B, respectively, that is, between the cam faces 73a and 75a and between the cam faces 73b and 75b, respectively.

As shown in FIG. 11, one of the opposite ends of a cable wire 77 loosely extending through a tubular sheath 78 which in turn extends rearwardly along the framework 70 is secured to a rear inside portion of the bracket 74, the other of said opposite ends of said cable wire 77 being connected with an operating member for the reclining mechanism of any known construction. Also, one of the opposite ends of a cable wire 79 loosely extending through a tubular sheath 80 which in turn extends forwardly along the framework 70 and is then bent rearwardly is secured to a front inside portion of the bracket 74, the other of said opposite ends of said cable wire 79 being connected with an operating member for the slide mechanism of any known construction. The bracket 72 on the pivot shaft 99 is connected with a link member 81 having one end pivotally connected thereto by means of a connecting pin 82 and the other end operatively coupled with an operating member, i.e., a seat lifter, of the seat lifting mechanism of any known construction, a substantially intermediate portion of said link member extending rearwardly along the framework 70.

While the multifunctional handle assembly according to the second embodiment of the present invention is constructed as hereinabove described, it operates in the following manner. The operating lever 97 is usually held in such a position as shown in FIGS. 11 and 12, which position is hereafter referred to as a neutral position. So long as the operating lever 97 is held in the neutral position, both of the operating members for the respective reclining and slide mechanisms are locked while the operating member for the seat lifting mechanism is held at a neutral position at which the seat bottom is maintained at a medium height position.

When the operating lever 97 is pivoted counterclockwise, as viewed in FIG. 11, about the pivot shaft 98 against a spring force acting in a circumferential direction, that is, when the operating lever 97 is pivoted in such a direction with the free end 97a thereof moving away from the framework 70, the cable wire 77 is pulled forwards (leftwards as viewed in FIG. 11) with the result that the operating member for the reclining mechanism is unlocked to permit the seat back to be adjustable in a tilt angle relative to the seat bottom. When the operating lever 97 is returned to the neutral position after the tilt adjustment, the operating member for the reclining mechanism is again locked to keep the seat back at a position of selected tilt angle relative to the seat bottom.

On the other hand, when the operating lever 97 is pivoted clockwise as viewed in FIG. 11 about the pivot shaft 98, extending widthwise of the automobile body structure, against a spring force acting in a circumferential direction, that is, when the operating lever 97 is pivoted in such a direction with the free end 97a thereof moving close towards the framework 70, the cable wire 79 is pulled rearwards (rightwards as view in FIG. 11) with the result that the operating member for the slide mechanism is unlocked to permit the seat to be adjusted in position in a direction longitudinally of the automobile body structure. When the operating lever 97 once pivoted in the direction close towards the framework 70 is returned to the neutral position after the seat position adjustment, the operating member for the slide mechanism is again locked to keep the seat at a selected seat position.

Figure 13:
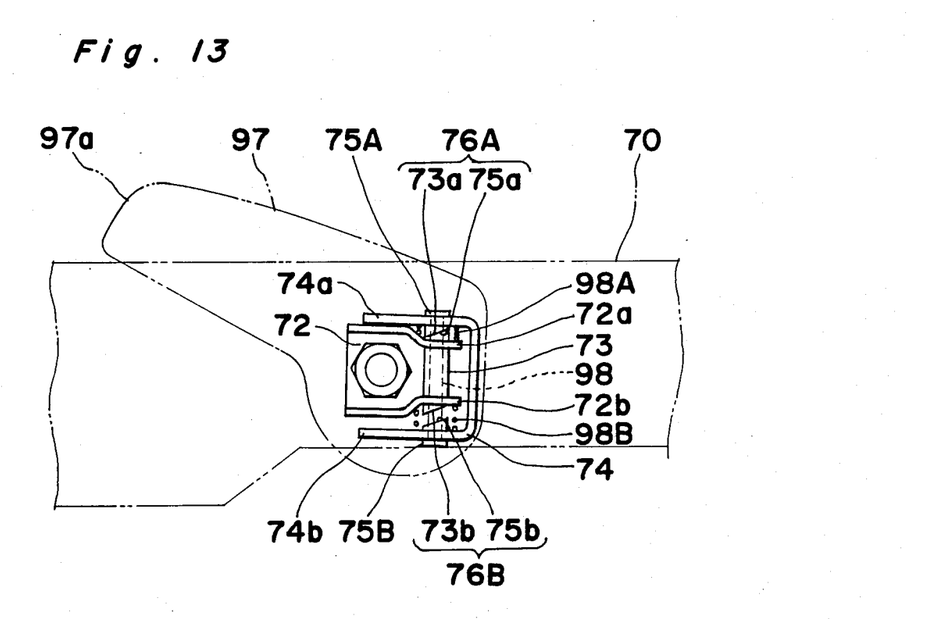

When the operating lever 97 is pivoted clockwise as viewed in FIG. 12, that is, when the free end 97a of the operating lever 97 is pulled upwards, the coil spring 98A around the shaft member 73 is, as shown in FIG. 13, compressed to bring the cam face 73a into contact with the mating cam face 75a of the stopper member 75A, that is, to bring the first engagement area 76A into engagement, thereby to prevent the operating lever 97 from pivoting about the pivot member 98A in a direction widthwise of the automobile body structure. The continued clockwise pivot of the operating lever 97 as viewed in FIG. 13 results in that the pivot shaft 99 (shown in FIG. 11) is angularly moved clockwise as viewed in FIG. 12 about the support shaft 71 together with the operating lever 97 with the link member 81 (shown in FIG. 11) consequently pulled rearwards (rightwards as viewed in FIG. 11). As the link member 81 is so pulled rearwards, the operating member for the seat lifting mechanism is activated to elevate the seat bottom and, hence, the seat as a whole, the height of the seat above the floor inside the automobile body structure being chosen at the time the pivotal movement of the operating lever 97 in the clockwise direction as viewed in FIG. 13 is interrupted.

Figure 14:
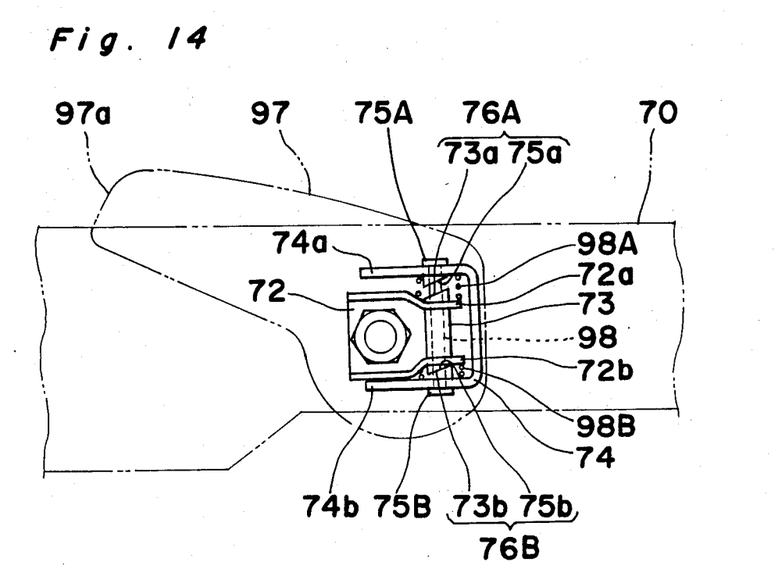

On the other hand, when the operating lever 97 is pivoted counterclockwise as viewed in FIG. 12, that is, when the free end 97a thereof is pushed downwards, the coil spring 98B around the shaft member 73 is, as shown in FIG. 14, compressed to bring the cam face 73b into contact with the mating cam face 75b of the stopper member 75B, that is, to bring the second engagement area 76B into engagement, thereby to prevent the operating lever 97 from pivoting about the pivot member 98B in a direction widthwise of the automobile body structure. The continued counterclockwise pivot of the operating lever 97 as viewed in FIG. 14 results in that the pivot shaft 99 is angularly moved to counterclockwise as viewed in FIG. 12 about the support shaft 71 together with the operating lever 97 with the link member 81 consequently pulled forwards, the operating member for the seat lifting mechanism is activated to lower the seat bottom and, hence, the seat as a whole, the height of the seat above the floor being chosen at the time the pivotal movement of the operating lever 97 in the counterclockwise direction as viewed in FIG. 14 is interrupted.

As hereinbefore described, when the operating lever 97 is pulled upwards, or pushed downwards, for effecting the seat height adjustment, the first or second engagement area 76A or 76B is brought into engagement to avoid any possible lateral pivot of the operating lever 97 in a direction close towards or away from the framework 70. Moreover, even though the operating lever 97 is more or less pivoted in a direction laterally of the framework at an initial stage of the pivotal movement of the operating lever 97 in a direction upwardly or downwardly, the operating lever 97 so pivoted a slight angular distance in the direction laterally of the framework 70 can readily be returned to a correct position by the engagement between the cam faces 73a and 75a or between the cam faces 73b and 75b.

In the event that the operating lever 97 is pushed downwards for activating the operating member for the seat lifting mechanism for the purpose of lowering the seat, then held at a higher position higher than the medium height position, down towards a lower position lower than the medium height position, the second engagement area 76B is brought into engagement as shown in FIG. 14, whereas in the event that the operating lever 97 is pulled upwards for activating the operating member for the seat lifting mechanism for the purpose of elevating the seat from the lower position towards the higher position, the first engagement area 76A is brought into engagement as shown in FIG. 13. Therefore, when the seat height adjustment is performed, the operating lever 97 is substantially blocked from its capability of being pivoted in the direction laterally of the framework 70 without both of the operating members for the reclining and slide mechanisms being unlocked.

Figure 15:
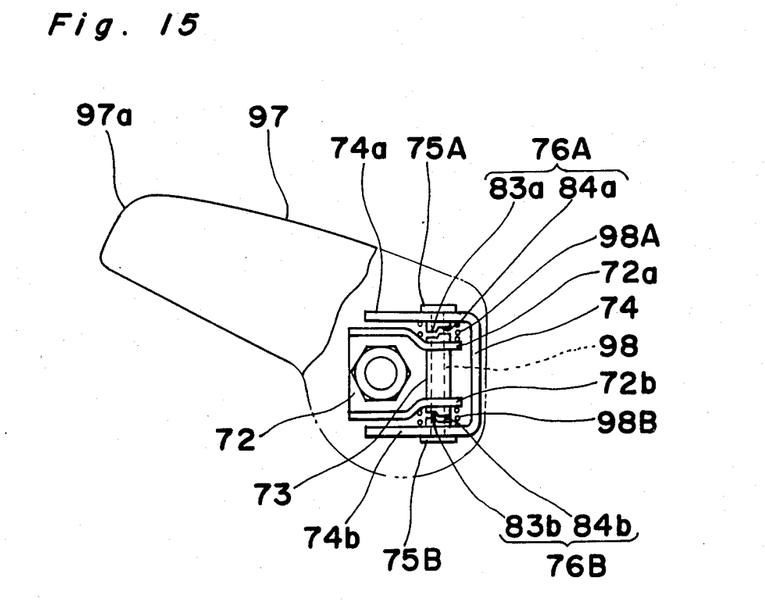
FIG. 15 is a view similar to FIG. 12, showing a modification of the handle assembly.

In the embodiment shown in and described with reference to FIGS. 11 to 14, the cam faces 73a and 73b and their mating cam faces 75a and 75b have been described and shown as continuously inclined relative to the longitudinal axis of the shaft member 73. However, the opposite ends of the shaft member 73 may be axially stepped to provide respective end faces 83a and 83b and the stopper members 75A and 75B may be correspondingly axially stepped to provide respective stepped end faces 84a and 84b as shown in FIG. 15.

Figure 16:
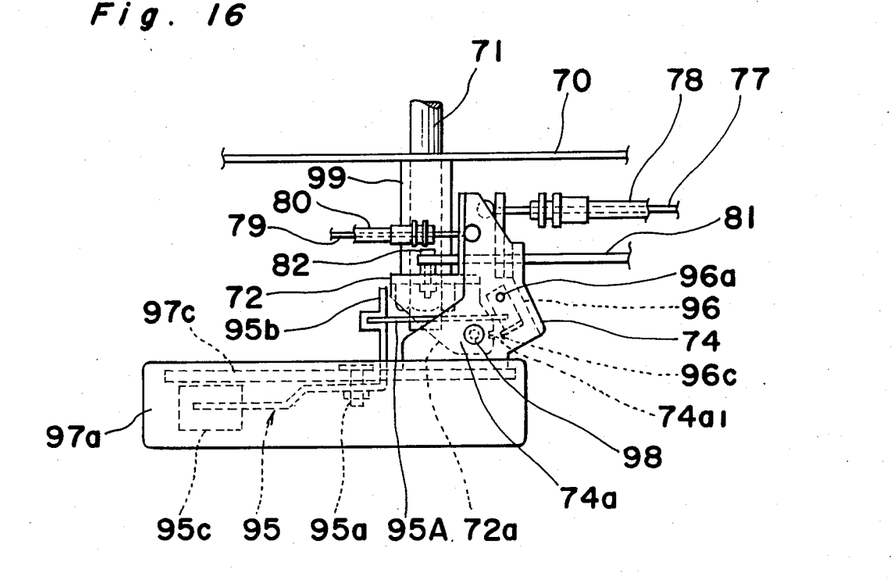
FIG. 16 is a view similar to FIG. 2, showing the handle assembly according to a third embodiment of the present invention.
Figure 17:
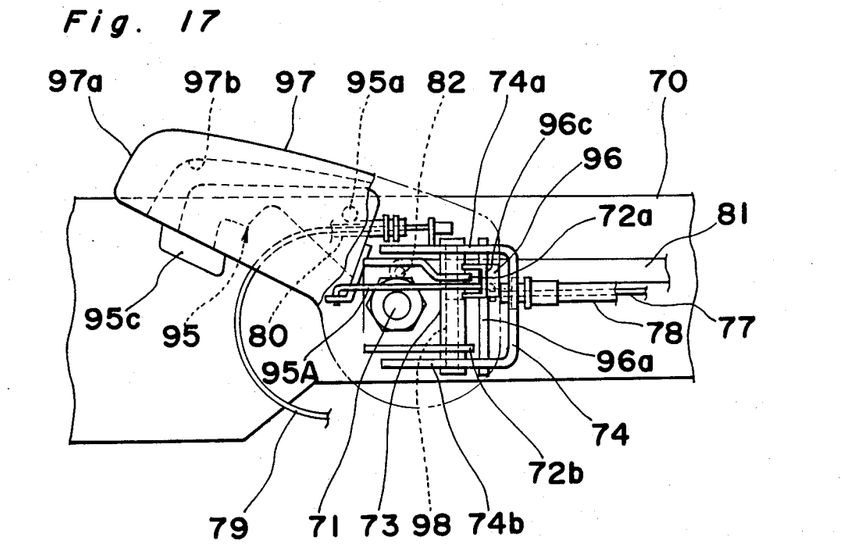
FIGS. 17 and 18 are side views of the handle assembly of FIG. 16, showing a lock lever in different operative positions, respectively.

The multifunctional handle assembly according to a third embodiment of the present invention is shown in FIGS. 16 to 19. The multifunctional handle assembly shown therein comprises operating lever 97 which is fitted to a seat framework 70 for pivotal movement in a direction widthwise of an automobile body structure and also in a direction heightwise of the automobile body structure by means of a horizontal pivot shaft 98, extending in a direction widthwise of the automobile body structure, and a vertical pivot shaft 99 extending in a direction heightwise of the automobile body structure as best shown in FIGS. 11 and 12. As best shown in FIG. 16, the vertical pivot shaft 99 is rotatably supported on and extends through a support shaft 71 secured rigidly to the framework 70 so as to extend through such framework 70 and is positioned exteriorly of the framework 70. As best shown in FIG. 17, an outer end of the pivot shaft 99 is provided with a bracket 72 having vertically opposed support arms 72a and 72b which support a tubular member 73 having its upper and lower ends non-rotatably extending through the support arms 72a and 72b, respectively, and a substantially intermediate portion situated therebetween.

The pivot shaft 98 rotatably extends through the tubular member 73 with its upper and lower ends fixed to upper and lower arms 74a and 74b, respectively, of a generally U-sectioned bracket 74 which is provided inside the operating lever 97 adjacent the bracket 74.

Reference numeral 95 represents a lock lever accommodated in a hollow 97b in the operating lever 97 and having a substantially intermediate portion pivotally connected by means of a pin 95a to a lever frame member 97c of the operating lever 97, and also has a rear end 35 bent to protrude interiorly to form an extension 95b. A lock member 96 is pivotally supported by a support pin 96a having its upper and lower ends rigidly secured respectively to the upper and lower arms 74a and 74b of the bracket 74 and is coupled with the extension 95b of the lock lever 95 by means of a link member 95A wherefor an operating head 95c integrally formed with a front end of the lock lever 95 normally protrudes downwardly from the operating lever 97 as shown in FIG. 17 and, at the same time, a lock piece 96c integrally formed with a free end of the lock member 96 is normally separated from a notch 74a1, formed in the upper arm 74a of the bracket.

As shown in FIG. 16, one of the opposite ends of a cable wire 77 loosely extending through a tubular sheath 78 which in turn extends rearwardly along the framework 70 is secured to a rear inside portion of the bracket 74, the other of said opposite ends of said cable wire 77 being connected with an operating member for the reclining mechanism of any known construction. Also, one of the opposite ends of a cable wire 79 loosely extending through a tubular sheath 80 which in turn extends forwardly along the framework 70 and is then bent rearwardly is secured to a front inside portion of the bracket 74, the other of said opposite ends of said cable wire 79 being connected with an operating member for the slide mechanism of any known construction. The bracket 72 on the pivot shaft 99 is connected with a link member 81 having one end pivotally connected thereto by means of a connecting pin 82 and the other end operatively coupled with an operating member, i.e., a seat lifter, of the seat lifting mechanism of any known construction, a substantially intermediate portion of said link member extending rearwardly along the framework 70.

While the multifunctional handle assembly according to the third embodiment of the present invention is constructed as hereinabove described, it operates in the following manner. The operating lever 97 is usually held in such a position as shown in FIGS. 16 and 17, which position is hereafter referred to as a neutral position. So long as the operating lever 97 is held in the neutral position, both of the operating members for the respective reclining and slide mechanisms are locked while the operating member for the seat lifting mechanism is held at a neutral position at which the seat bottom is maintained at a medium height position.

When the operating lever 97 is pivoted counterclockwise, as viewed in FIG. 16, about the pivot shaft 98, that is, when the operating lever 97 is pivoted in such a direction with the free end 97a thereof moving away from the framework 70, the cable wire 77 is pulled forwards (leftwards as viewed in FIG. 16) with the result that the operating member for the reclining mechanism is unlocked to permit the seat back to be adjustable in a tilt angle relative to the seat bottom. When the operating lever 97 is returned to the neutral position after the tilt adjustment, the operating member for the reclining mechanism is again locked to keep the seat back at a position of selected tilt angle relative to the seat bottom.

On the other hand, when the operating lever 97 is pivoted clockwise as viewed in FIG. 16 about pivot shaft 98, extending widthwise of the automobile body structure, that is, when the operating lever 97 is pivoted in such a direction with the free end 97a thereof moving close towards the framework 70, the cable wire 79 is pulled rearwards (rightwards as view in FIG. 16) with the result that the operating member for the slide mechanism is unlocked to permit the seat to be adjusted in position in a direction longitudinally of the automobile body structure. When the operating lever 97 once pivoted in the direction close towards the framework 70 is returned to the neutral position after the seat position adjustment, the operating member for the slide mechanism is again locked to keep the seat at a selected seat position.

When the operating head 95c of the lock lever 95 is pushed upwards to cause the lock lever 95 to pivot clockwise about the pin 95a as viewed in FIG. 17, the link member 95A is pulled forwards with the lock piece 96b of the lock member 96 consequently engaged in the notch 74a1, in the upper arm 74a of the bracket 74 whereby the operating lever 97 is prevented from pivoting about the pivot shaft 98 in a direction widthwise of the automobile body structure, i.e., laterally of the framework 70. When the operating lever 97 is pivoted clockwise about the support shaft 71 as viewed in FIG. 18 after the engagement of the lock piece 96c into the notch 74a1, that is, after the operating lever 97 has been held in position unable to pivot in the direction laterally of the framework 70, the link member 81 is moved rearwards (rightwards as viewed in FIGS. 16 to 19) and the operating member for the seat lifting mechanism is activated to elevate the seat bottom and, hence, the seat as a whole, the height of the seat above the floor being chosen at the time the pivotal movement of the operating lever 97 in the clockwise direction as viewed in FIG. 17 is interrupted.

Figure 18:
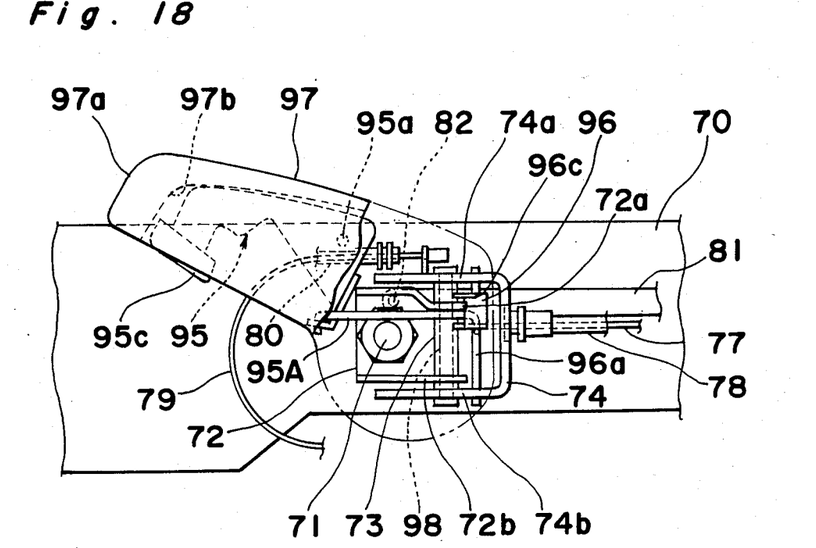
Figure 19:
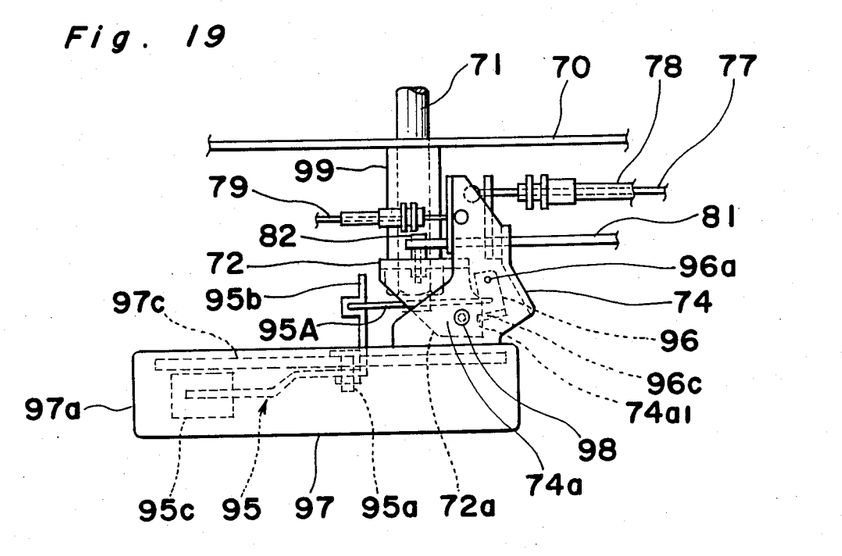
FIG. 19 is a view similar to FIG. 16, showing the lock lever held at such a position as shown in FIG. 18.

However, when the operating lever 97 is pivoted counterclockwise as viewed in FIG. 18, the link member 81 is moved forwards (leftwards as viewed in FIGS. 16 to 19), the operating member for the seat lifting mechanism is activated to lower the seat bottom and, hence, the seat as a whole, the height of the seat above the floor being chosen at the time the pivotal movement of the operating lever 97 in the counterclockwise direction is interrupted.

As hereinbefore described, when the seat height adjustment is desired to be effected, the operating lever 97 is rendered unable to pivot in the direction laterally of the framework 70 by pushing the operating head 95c of the lock lever 95 to cause the lock piece 96c of the lock member 96 to engage in the notch 74$a_1$ in the upper arm 74a of the bracket 74. Therefore, there is no possibility that one of the respective operating members for the reclining and slide mechanisms may be erroneously unlocked while the seat height adjustment is being effected, that is, when the operating lever 97 is pivoted about the support shaft 71.

It is to be noted that, when the head 95c of the lock lever 95 is released from the external pushing force applied thereto for pushing it upwards while the operating lever 97 has been pivoted clockwise or counterclockwise about the support shaft 71 from the position shown in FIG. 18 for the seat height adjustment, the lock lever 95 returns to the original position by the action of a spring (not shown) with the lock piece 96b of the lock member 96 consequently disengaged from the notch 74$a_1$ in the bracket 74 as shown in FIG. 16, permitting the operating lever 97 to be ready to be pivoted in a direction laterally of the framework 70.

It is also to be noted that, in the event that the operating lever 97 is pivoted counterclockwise about the shaft 71 for activating the operating member for the seat lifting mechanism for the purpose of lowering the seat, then held at a higher position higher than the medium height position, down towards a lower position lower than the medium height position, or in the event that the operating lever 97 is pivoted clockwise about the shaft 71 for activating the operating member for the seat lifting mechanism for the purpose of elevating the seat from the lower position towards the higher position, the operating lever 97 can be prevented from pivoting in the direction laterally of the framework 70 merely by pushing the operating head 95c of the lock lever 95 upwards.

Although the present invention has fully been described in connection with the preferred embodiments thereof with reference to the accompanying drawings, it is to be noted that various changes and modifications are apparent to those skilled in the art. Such changes and modifications are, unless they depart from the scope of the present invention as defined by the appended claims, to be construed as included therein.

What is claimed is:

1. An adjustable seat assembly for an automobile which comprises, in combination:
    a seat supported on a support surface and including a seat bottom for the support of an occupant from below and a seat back for the support of the occupant from behind, said seat bottom and seat back being pivotally connected together so that the seat assembly is of a generally L-shaped configuration;
    a reclining mechanism for connecting the seat back to the seat bottom for the adjustment of the seat back to one of a plurality of tilt positions in which the seat back forms a different angle of tilt relative to the seat bottom;
    a slide mechanism for mounting the seat bottom on the support surface for the adjustment of the seat bottom to any one of a plurality of seat positions in a direction along the support surface;
    a seat lifting mechanism operable to adjust the seat to one of a plurality of seat height positions in a direction generally perpendicular to the support surface:
    a multifunctional handle carried by the seat bottom for movement in first, second and third directions;
    a first connecting means connecting the handle with the reclining mechanism for, only when the handle is moved in the first direction, releasing the reclining mechanism to permit the adjustment of the seat back;
    a second connecting means connecting the handle with the slide mechanism for, only when the handle is moved in the second direction, releasing the slide mechanism to permit the adjustment of the seat bottom; and
    a third connecting means connecting the handle with the seat lifting mechanism for, only when the handle is moved in the third direction, releasing the seat lifting mechanism to permit the adjustment of the seat to any one of the seat height positions, said lifting mechanism being operatively coupled with said handle.

2. The assembly as claimed in claim 1, further comprising means when the handle is moved in one of the first and second directions, to inhibit the movement of the handle in the other of the first and second directions.

3. The assembly as claimed in claim 1, wherein said first and second directions for the movement of the handle are opposite to each other and lie generally widthwise of the automobile in a plane generally parallel to the support surface, and said third direction for the movement of the handle lies in a plane generally perpendicular to said plane in which the first and second directions lie.

4. The assembly as claimed in claim 1, further comprising first and second shaft members, said first shaft member being supported so as to extend generally parallel to the support surface and perpendicular to the direction in which the seat bottom is adjusted to any one of the seat positions, said second shaft member is supported so as to extend substantially perpendicular to the first shaft member and at an angle to the support surface, a first mounting means for operatively coupling the handle with the first shaft member while permitting the handle to pivot in at least the third direction about the first shaft member, a second mounting means for operatively coupling the handle with the second shaft member while permitting the handle to pivot in one of the first and second directions opposite to each other and generally widthwise of the automobile about the second shaft member, and a third connecting means connecting the handle with the seat lifting mechanism so that when the handle is moved in the third direction generally heightwise of the automobile about the first shaft member, the seat is adjusted to any one of the seat height positions.

5. The assembly as claimed in claim 4, further comprising means provided on the first shaft member for inhibiting the movement of the handle in any one of the first and second directions only when the handle is moved in the third direction.

6. The assembly as claimed in claim 4, further comprising a lock lever supported for pivotal movement in a plane conforming with the third direction between operative and inoperative positions, and a lock member operable, only when the lock lever is moved from the inoperative position to the operated position prior to the movement of the handle in the third direction, for inhibiting the movement of the handle in any one of the first and second directions during the movement of the handle in the third direction.

* * * * *